Feb. 19, 1952 D. L. HINGS 2,586,230

INVERTER AMPLIFIER AND AUTOMATIC LIMITER

Filed Aug. 6, 1945

INVENTOR
Donald L. Hings
BY Strandling and Krost
ATTORNEYS.

Patented Feb. 19, 1952

2,586,230

UNITED STATES PATENT OFFICE 2,586,230

INVERTER AMPLIFIER AND AUTOMATIC LIMITER

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,265
In Canada July 20, 1945

2 Claims. (Cl. 250—20)

My invention relates in general to amplifiers and more particularly to an amplifier and automatic limiter.

An object of my invention is to limit spurious interference waves to an amplitude which does not materially exceed the maximum amplitude of the modulated carrier waves.

Another object of my invention is to vary the amount of the limiting of the spurious interference waves in accordance with carrier power changes.

Another object of my invention is to limit the passage of audio energy in an amplifier tube when the audio energy exceeds a pre-determined value in relation to the carrier energy.

Another object of my invention is to control the value at which the audio energy is limited in accordance with the power of the carrier wave.

Another object of my invention is to amplify and automatically limit the audio output from a detector circuit.

Another object of my invention is to employ a detector for feeding energy to an implifier in which the amplifier amplifies and limits the energy from the detector and in which the detector circuit is such that it may feed energy to a diode rectifier for automatic volume control.

Other objects and a fuller understanding of my invention may be had by referring to the following description and claims, taken in conjunction with the accompanying drawing in which:

Figure 1:
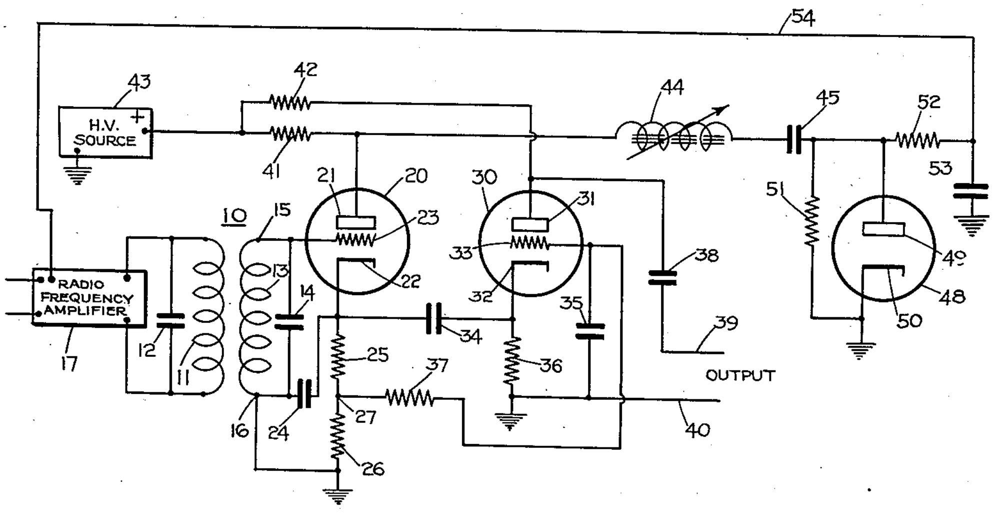
Figure 1 shows a diagrammatic illustration of a circuit embodying the features of my invention.
Figure 2:
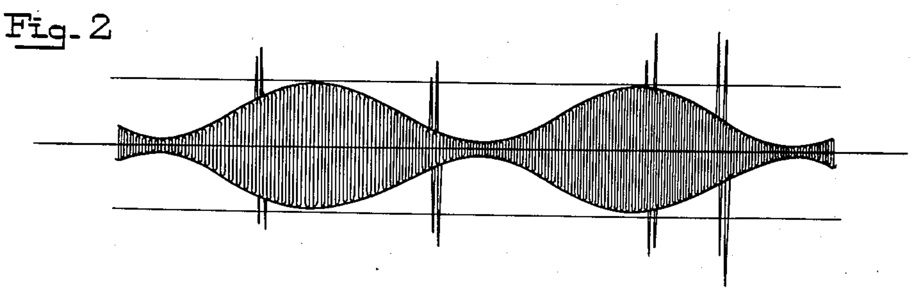
Figure 2 is a representation of a modulated carrier wave having spurious interference energy shown thereon.

In the drawing, the reference character 10 represents a transformer, having a primary winding 11 and a secondary winding 13 in which the primary winding is adapted to be energized by incoming modulated carrier waves from a radio frequency amplifier indicated by the block 17. A condenser 12 is connected across the primary winding 11 and constitutes, in combination with the primary winding, a resonant circuit which is tuned substantially to resonance at a frequency equal to the frequency of the incoming carrier waves. Similarly, a condenser 14 is connected across the secondary winding 13 and constitutes, in combination therewith, a resonant circuit which is tuned substantially to resonance at a frequency equal to the incoming carrier wave frequency. The energy from the transformer 10 is detected by a detector tube 20 having a plate 21, a cathode 22 and a grid 23 which is connected directly to the upper terminal 15 of the secondary winding 13 of the transformer 10. The grid 23 has infinite impedance with respect to ground. The cathode 22 is connected to the lower terminal 16 of the secondary winding 13 by a high frequency by-pass condenser 24. The cathode 22 is connected to ground through two resistors 25 and 26. The resistor 25 is a filter resistor and the resistor 26 is a detector load resistor. The plate 21 of the detector tube 20 is connected to a high voltage source 43 through a plate high frequency impedance 41. The detector tube 20 feeds detected audio energy into an amplifier 30 which functions both as an amplifier and a voltage limiter. The amplifier tube 30 comprises a plate 31, a cathode 32 and a grid 33. The cathode 32 of the tube 30 is coupled to the cathode 22 of the tube 20 through a low frequency coupling condenser 34. The cathode 32 of the tube 30 is connected to ground through a cathode biasing resistor 36. The grid 33 of the tube 30 is coupled to ground through a low frequency by-pass condenser 35 and is also connected to a point 27 intermediate the two resistors 25 and 26 through a grid resistor 37. The audio output of the amplifier tube 30 appears across the output conductors 39 and 40 and the condenser 38 constitutes an output coupling condenser. The plate 31 is connected to the high voltage source 43 through a plate load resistor 42.

The output from the plate 21 of the detector tube is adapted to be connected to a diode rectifier tube 48 having a plate 49 and a cathode 50. The diode rectifier tube 48 constitutes a potential source for the automatic volume control circuit. The cathode 50 of the diode rectifier is connected to ground. The resistor 51 is a diode load resistor and is connected between the plate 49 and the cathode 50. The resistor 52 is a filter resistor and is connected to ground by a low frequency by-pass condenser 53. The output of the plate 49 is fed through a conductor 54 to the radio frequency amplifier 17 for regulating the output of the radio amplifier 17 which supplies energy to the transformer 10.

The plate 21 of the detector tube 20 and the plate 49 of the diode rectifier tube 48 are interconnected by a high frequency plate load impedance element 44 and a direct current blocking condenser 45. The impedance element 44, in combination with the inter-electrode capacitance between the plate 49 and the cathode 50, constitutes a series resonant circuit. The impedance between the plate 21 and ground is low and the impedance between the plate 49 and ground is high. The tube 20, in order to function in its detector circuit, has a relatively low impedance load, whereas the diode rectifier 48 in the circuit as shown has a high impedance load. Thus, the load from the detector represents a current fed circuit and the load from the diode rectifier represents a voltage fed circuit. Inasmuch as the impedance 44, in combination with the inter-electrode capacitance between the plate 49 and the cathode 50, functions as a series resonant circuit, I am able to operate the diode rectifier as a load from the detector tube without appreciable distortion, and thus my circuit may be characterized as a detector fed automatic volume control circuit. The load on the diode rectifier 48 causes substantially no distortion on the output of the detector tube 20. The diode rectifier 48 and the automatic volume control circuit and the connections of the diode rectifier 48 to the detector tube 20 may be the same as that shown and described in my pending application, Serial Number 609,264, filed on the sixth day of August, 1945, Patent No. 2,540,483, granted February 6, 1951, entitled Detector Fed Automatic Volume Control, and executed concurrently herewith.

Figure 3:
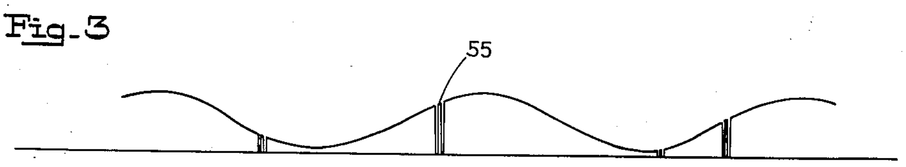
Figure 3 is a representation of an audio wave which has been amplified and limited after detection of the wave in Figure 2.

In operation, during the periods of the positive half cycles of the modulation envelope of the modulated carrier waves, the grid 23 of the detector tube is biased more positive, with the result that an increased amount of current flows between the cathode 22 and the plate 21. The flow of current through the detector tube is directly proportional to the amplitude of the envelope of the modulated carrier wave and thus modulation frequency energy appears in the cathode 22. This modulation frequency energy is fed to the cathode 32 of the amplifier through the low frequency coupling condenser 34. The grid 33 of the amplifier tube 30 is held at ground potential for modulated frequency waves through the low frequency by-pass condenser 35. Therefore, the grid 33 and the cathode 32 are both excited by energy from the detector tube 20. When the grid 23 swings more positive, the tube 20 passes more current, and the cathode end of resistor 26 becomes more positive which biases the cathode 32 in a more positive direction to cause the tube 30 to pass less current; hence, the output of the amplifier 30 generates an audio voltage wave which is proportional to the modulated carrier wave. Figure 3 shows an audio frequency wave which may be a representation of the voltage output of the amplifier tube 30. The amplifier tube 30 is biased with direct current through the resistor 37 to the point 27 and the current flowing within the tube 30 will be proportional to the voltage change across 25 and 26 which is, in turn, proportional to the carrier wave energy. It is noted that the grid 33 is biased with direct current through the resistor 37 which is connected to the point 27 intermediate the two resistors 25 and 26. Thus, with no carrier wave frequency impressed on the transformer 10, the grid 33 is adjusted to a point 27. With no carrier wave energy on the transformer 10, the grid 23 and the cathode 22 are so biased as to allow a small amount of direct current to flow through the cathode-to-plate circuit 22—21. This small amount of direct current flowing through the resistors 26 and 25, when no carrier wave energy is applied to the transformer 10, produces a positive bias on the grid 33, since it is connected to the point 27 through the resistor 37. This positive bias is very much less than the negative bias on the grid between the grid 33 and the cathode 32 through the resistor 36. Therefore, the amplifier tube 30 is biased nearly to cut-off when there is no carrier wave impressed on transformer 10. When a spurious interference wave appears at a time when no carrier wave energy is being applied to the transformer 10, then this spurious wave energy cannot pass through the amplifier tube 30 because the excitation passed to the cathode 32 of the amplifier tube merely creates an even greater negative bias on grid 33 which thereby cuts off the spurious energy wave from passing through the tube 30.

In operation, when one is tuning between stations, there is not the usual cracking and noise generated in my system, as found in other systems. When a spurious interference energy appears at a time when carrier wave energy is being applied to the transformer 10 and in the event the spurious interference energy exceeds the amplitude of the envelope of the modulated carrier wave, then the spurious interference energy as it attempts to pass through the amplifier 30 is limited to a voltage value which is controlled by the grid 33 by the potential at 27 which changes in accordance with the power of the carrier wave. Thus, the amplitude of the spurious energies are limited in accordance with the power of the carrier wave. From the appearance upon an oscilloscope, the maximum amplitude of the spurious energy waves, as limited by the amplifier 30, may be said "to follow" the envelope of the modulated carrier wave. In other words, under the most unfavorable conditions, the amplitude of the spurious interference energy as it appears upon the oscilloscope does not have any higher amplitude than the maximum amplitude of the modulated carrier wave. The modulation energy controls the noise peaks, instead of the noise peaks controlling the modulation energy. Because of this operation of the amplifier 30, the energy waves which are not cut off appear as negative energy in the audio output circuit 39—40. This negative energy appears as slots or depressions in the audio wave, such, for example, as at 55 in Figure 3.

Although I have shown and described my invention with a certain degree of particularity, it is understood that changes may be made therein without departing from the spirit of the invention which are included within the scope of the claims hereinafter set forth.

I claim as my invention:

1. A radio circuit comprising, in combination, an amplifier tube including at least a plate, a cathode and a grid, first circuit means for developing a direct current voltage having a positive potential point above ground, second circuit means adapted to apply to said first circuit means a carrier wave having signal intelligence, third circuit means for varying the amount of the positive potential on said point above ground in accordance with the strength of the carrier wave, means including filter means for connecting the grid of the amplifier tube to said point to establish said grid at a potential in accordance with the average of said variable positive potential and substantially eliminating said signal intelligence, fourth circuit means responsive to the signal intelligence of the carrier wave for applying an exciting voltage from said first circuit means to the cathode of the amplifier tube and substantially excluding direct current, and an output circuit connected to the plate of the amplifier tube.

2. A radio circuit comprising a detector circuit for detecting the intelligence component of said carrier wave, an amplifier circuit for amplifying the intelligence component obtained from said detector circuit, and an output circuit for utilizing said amplifier modulation component, said detector circuit including a detector tube, a cathode resistor and a series resonant circuit serially connected in a closed circuit arrangement, said detector tube having a plate, a cathode and a grid, said detector circuit including connection means for connecting said carrier wave source between said grid and said cathode, and a carrier wave by-pass condenser connected across said cathode resistor, said series resonant circuit interconnecting said detector plate and said cathode resistor to establish low impedance to ground for said detector plate, said amplifier circuit including an amplifier tube having a plate, cathode and grid, low frequency coupling means between the said two cathodes to pass low frequency and substantially exclude direct current, low frequency by-pass means connecting said amplifier grid to ground, a cathode resistor connecting said amplifier cathode to ground, the amplifier circuit output being between said amplifier plate and ground, and connection means for connecting said amplifier grid to a point on the cathode resistor in said detector circuit to establish said grid at a potential corresponding to the potential of said point.

DONALD L. HINGS.

REFERENCES CITED

The following references are of record in the file of this patent:

UNITED STATES PATENTS

| Number | Name | Date |
|---|---|---|
| 1,909,239 | Travis | May 16, 1933 |
| 2,013,307 | Harris | Sept. 3, 1935 |
| 2,129,021 | Nicholson, Jr. | Sept. 6, 1938 |
| 2,199,401 | Haffcke | May 7, 1940 |
| 2,208,398 | Simons | July 16, 1940 |
| 2,246,331 | White et al. | June 17, 1941 |
| 2,252,066 | Dallos | Aug. 12, 1941 |
| 2,253,450 | Travis | Aug. 19, 1941 |
| 2,276,565 | Crosby | Mar. 17, 1942 |

FOREIGN PATENTS

| Number | Country | Date |
|---|---|---|
| 436,856 | Great Britain | Oct. 15, 1935 |
| 471,812 | Great Britain | Sept. 10, 1937 |
| 492,407 | Great Britain | Sept. 20, 1938 |